US006845429B2

(12) United States Patent
Mattausch et al.

(10) Patent No.: US 6,845,429 B2
(45) Date of Patent: Jan. 18, 2005

(54) MULTI-PORT CACHE MEMORY

(75) Inventors: Hans Jurgen Mattausch, Higashihiroshima (JP); Koji Kishi, Kodaira (JP); Nobuhiko Omori, Higashihiroshima (JP)

(73) Assignee: President of Hiroshima University, Higashihiroshima (JP)

( * ) Notice: Subject to any disclaimer, the term of this patent is extended or adjusted under 35 U.S.C. 154(b) by 268 days.

(21) Appl. No.: 09/919,859

(22) Filed: Aug. 2, 2001

(65) Prior Publication Data

US 2002/0019912 A1 Feb. 14, 2002

(30) Foreign Application Priority Data

Aug. 11, 2000 (JP) ........................................ 2000-244524

(51) Int. Cl.[7] .............................................. G06F 13/00
(52) U.S. Cl. ...................................... 711/131; 711/133
(58) Field of Search ................................ 711/131, 133, 711/147, 149; 709/225, 108; 365/230.05, 230.06

(56) References Cited

U.S. PATENT DOCUMENTS 5,274,790 A * 12/1993 Suzuki ....................... 711/133

FOREIGN PATENT DOCUMENTS

| JP | 54-066277 | 5/1979 |
| JP | 08-036525 | 2/1996 |
| JP | 2000-276400 | 10/2000 |

OTHER PUBLICATIONS

Jude A. Rivers et al., "On High–Bandwidth Data Cache Design for Multi–Issue Processors", IEEE, Dec. 1997.*
H.J. Mattausch, "Hierachical Architecture for Area Efficient Integrated N–Port Memories with Latency–Free Multi–Gigabit per Second Access Bandwidth", Electronic Letters, Aug. 1999, vol. 35, No. 17, pp. 1–2.*

(List continued on next page.)

Primary Examiner—Pierre M. Vital
(74) Attorney, Agent, or Firm—Oblon, Spivak, McClelland, Maier & Neustadt, P.C.

(57) ABSTRACT

The conventional multi-port cache memory, which is formed by using multi-port cells, is excellent in its operating speed. However, the integration area of the constituent multi-port cells is increased in proportion to the square of the number of ports. Thus, if it is intended to decrease the cache miss probability by increasing the storage capacity, the chip size is increased correspondingly, which increases the manufacturing cost. On the other hand, the multi-port cache memory of the present invention is formed by using, as constituents, one-port cell blocks adapted for a large storage capacity, making it possible to easily provide a multi-port cache memory of a large storage capacity and reduced integration area, which has a large random access bandwidth, is capable of parallel access from a plurality of ports, and is adapted for use in advanced microprocessors having a small cache miss probability.

52 Claims, 11 Drawing Sheets

OTHER PUBLICATIONS

H. J. Mattausch, "Hierarchical Architecture for Area–Efficient Integrated N–Port Memories with Latency–Free Multi–Gigabit Per Second Access Bandwidth", Electronics Letters, Aug. 19, 1999, vol. 35, No. 17, pp. 1–2.

Shimada Sou, Ando Hideki and Shimada Toshio, "Multi-bank Cache having no Cross–Bus Switch", reports of 2000 Memorial Parallel Processing Symposium (JSPP2000), Information Processing Society of Japan, May 30, 2000, pp. 107–114.

Sasaki Takayasu, Tsuchie Totsuo, Hironaka Tetsuo and Kojima Akira, Study of Method of Implementing Data Cache for Superscalar Processor:, Report of the Information Processing Society of Japan, Aug. 29, 1996, vol. 96, No. 80 (96–ARC–119), pp. 215–220.

Natomi Akira, Kuga Morihiro, Murakami Kazuaki and Tomita Masaharu, "Load/Store Pipeline of DSN–mode Superscalar Processor Prototype", Jan. 24, 1991, vol. 91, No. 9, (91–ARC–86), pp. 1–8.

* cited by examiner

| Atag (mtag bits) | Aind (mind bits) | Aword (mword bits) | Abyte (mbyte bits) |
|---|---|---|---|

FIG. 3 PRIOR ART

General Case

| Atag (mtag bits) | Aind2 (mind2 bits) | Aind1 (mind1 bits) | Aword (mword bits) | Abyte (mbyte bits) |
|---|---|---|---|---|

FIG. 5A

512Kbit, Direct-Mapped, 8-Port Cache, 4 Word Per Line Cache Memory
(32Bit Addresss Space, 32bit Wordlength)

| | Atag (bits) | Aind2 (bits) | Aind1 (bits) | Aword (bits) | Abyte (bits) |
|---|---|---|---|---|---|
| Conventinal Multi-Port Cache Memory | 16 | 12 | | 2 | 2 |
| Multi-Port Cache Memory according to the invention | 16 | 7<br>Data-Storage: 128 blocks each 4Kbit<br>Tag-storage: 128 blocks each 480bit | 5 | 2 | 2 |

FIG. 5B

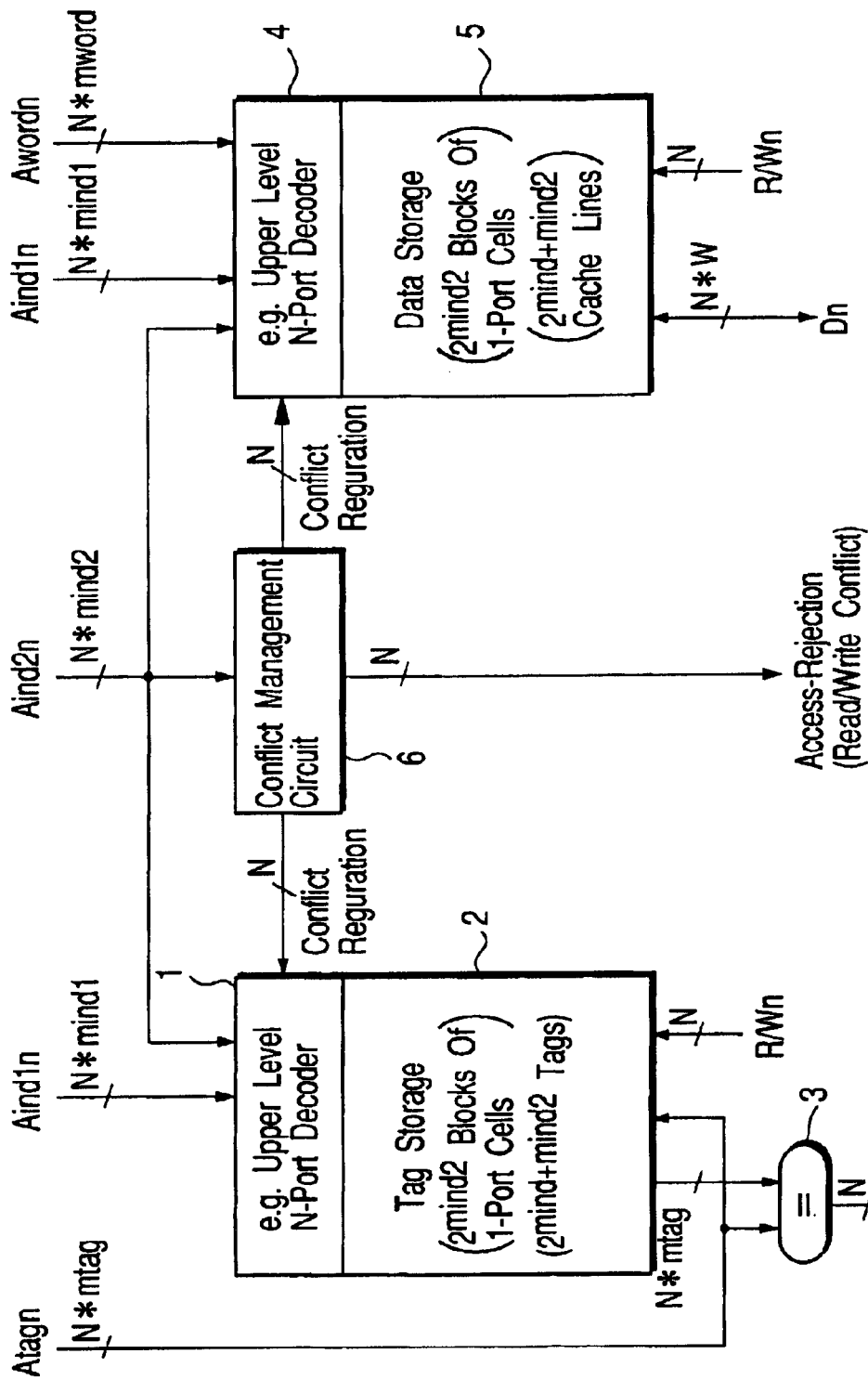
F I G. 4

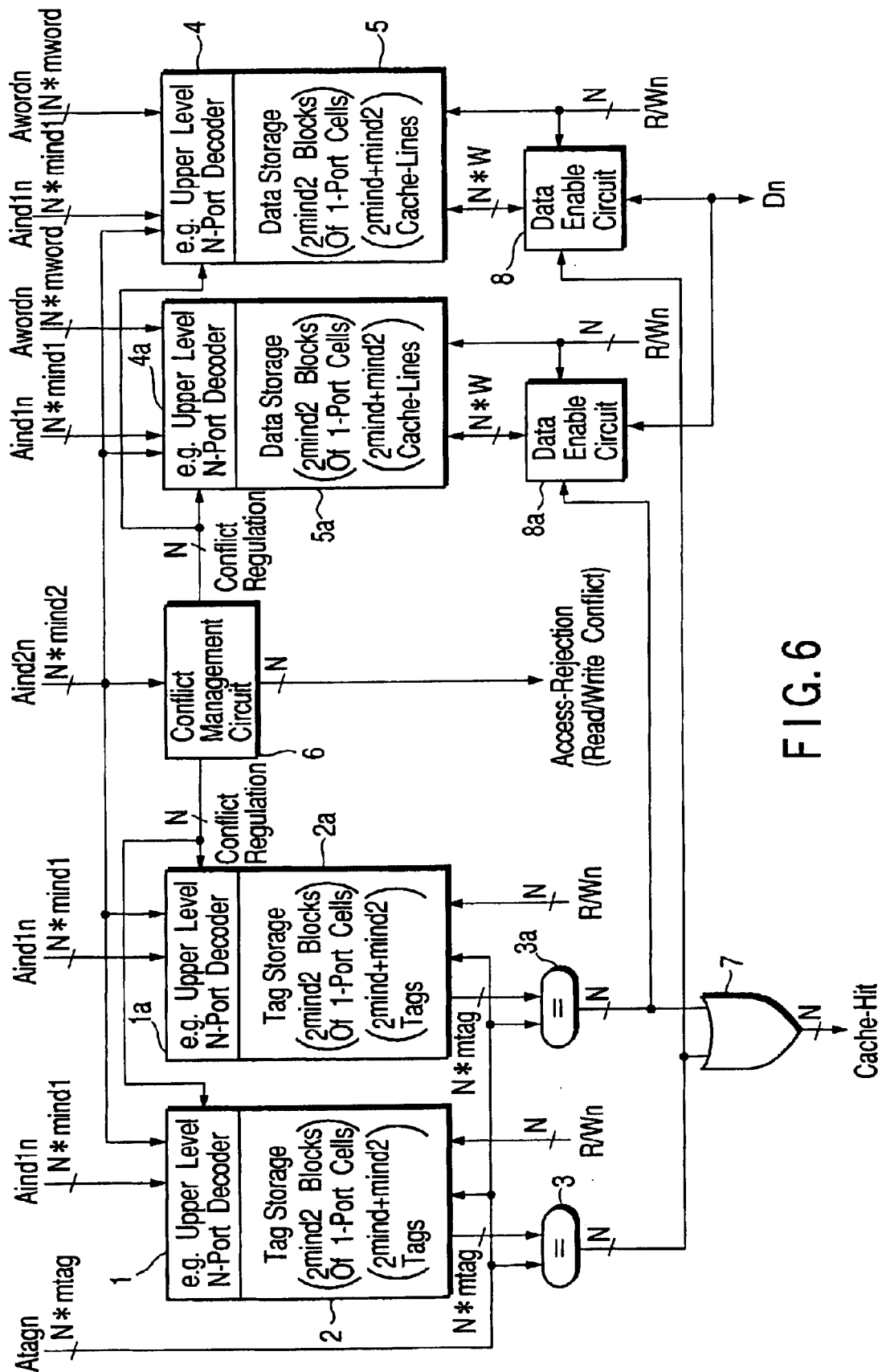
F I G. 6

MULTI-PORT CACHE MEMORY

CROSS-REFERENCE TO RELATED APPLICATIONS

This application is based upon and claims the benefit of priority from the prior Japanese Patent Application No. 2000-244524, filed Aug. 11, 2000, the entire contents of which are incorporated herein by reference.

BACKGROUND OF THE INVENTION

The present invention relates to a multi-port cache memory, particularly, to a multi-port cache memory consisting of 1-port SRAM (Static Random Access Memory) cell blocks adapted for decreasing the chip area of high performance microprocessors.

A multi-port cache memory formed of multi-port SRAM cell blocks is included in the multi-port cache memories used in conventional high performance microprocessors. FIG. 1 shows as an example of the architecture of a multi-port cache memory for a direct-map scheme.

The conventional multi-port cache memory shown in FIG. 1 comprises a cache-hit comparing circuit 30 and a tag memory consisting of an N-port decoder 10 and a tag storage 20 on the side of the tag, a data memory consisting of an N-port decoder 40 and a data storage 50 on the side of the data. Tag storage 20 and data storage 50 are constructed from multi-port storage cells (e.g. multi-port SRAM cells). It is possible to store $2^{mind}$ tags in the tag memory. Also, $2^{mind}$ cache lines are included in the data memory.

In executing a cache access from a port, the internal identification of the cache memory is performed with a tag, a cache line index and a cache line offset. The tag, cache line index and cache line offset (data word) for the n-th port are represented by $Atag_n$, $Aind_n$, and $Aword_n$, respectively. Also, the number of address bits used for the tag is represented by mtag, the number of address bits used for the cache line index is represented by mind, and the number of address bits used for the cache line offset is represented by mword. Further, the number of ports of the tag memory and the data memory is represented by N.

The tags $Atag_n$ for the N ports are transmitted through a N*mtag bit wide bus into the tag memory, and the cache line indices $Aind_n$ of N*mind bits are transmitted into the N-port decoder 10 of the tag memory so as to compare the tags of the accessed data lines to the tags of the data lines stored in the data memory of the cache under the line indices $Aind_n$. The comparison is made in a cache-hit-comparing circuit 30. If the tags $Atag_n$ are found to agree with the corresponding tags stored under the line indices $Aind_n$, corresponding cache hit signals are transmitted into the data bus. If any of the tags $Atag_n$ do not agree with the corresponding tags stored under the line indices $Aind_n$, the respective access operations are processed as cache-misses. Incidentally, the symbol $R/W_n$ shown in FIG. 1 represents read and write instructions transmitted from the processor core (not shown).

Also, the cache line indices $Aind_n$ of the N ports of N*mind bits and the cache line offsets $Aword_n$ of N*mword bits are transmitted through the address bus into the N-port decoder 40 of the data memory. In the case of cache hits, the data words $D_n$ are transmitted between the cache lines identified by the line indices $Aind_n$ in the data memory and the processor core. The merit that a cache line has more than 1 data word can be realized by using the cache line offsets $Aword_n$ added to the addresses of the data memory.

Incidentally, in the multi-port cache memory shown in FIG. 1, the tag memory and the data memory are separated from each other. However, it is possible to combine the tag memory and the data memory into one tag-data memory.

An example of a multi-port cache memory of a 2-way set-associative scheme will now be described with reference to FIG. 2. The multi-port cache memory of the 2-way set-associative scheme is an extension of the direct-map scheme described above.

The multi-port cache memory shown in FIG. 2 comprises N-port decoders 10, 10a, tag storages 20, 20a, forming 2 tag memories, cache hit comparing circuits 30, 30a, and OR gates 70 inputting the results of comparison on the side of the tag and N-port decoders 40, 40a, data storages 50, 50a, forming 2 data memories, and data enable circuits 80, 80a on the side of the data. Each of the tag storages 20, 20a and the data storages 50, 50a is formed from multi-port storage cells.

The multi-port cache memory of the 2-way set-associative scheme shown in FIG. 2 performs functions similar to those performed by the multi-port cache memory of the direct-map scheme shown in FIG. 1, except that the OR gates 70 for transmitting cache hit signals upon receipt of the results of comparison performed in the cache hit comparing circuits 30, 30a and the data enable circuits 80, 80a which permit transmitting the data words $D_n$ between the data bus and the data memories upon receipt of the results of comparison performed in the cache-hit-comparing circuits 30, 30a are added to the multi-port cache memory of the 2-way set-associative scheme shown in FIG. 2. Therefore, the corresponding components of the multi-port memories are denoted by the same reference numerals so as to avoid an overlapping description.

FIG. 3 shows the division of the address bits for the access of a port to the cache memory into the tag Atag, the cache line index Aind, the cache line offset Aword, and the byte offset Abyte.

The conventional multi-port cache memory using the multi-port storage cells described above was not actually used in many cases. The reason is as follows.

Specifically, it is necessary for the multi-port cache memory to have a large storage capacity in order to achieve a low cache miss rate. It should be noted in this connection that the area of the multi-port SRAM constructed from multi-port storage cells increases in proportion to the square of the number of ports. Therefore, if the number of ports is increased to make the multi-port SRAM adapted for use in a high performance microprocessor, the chip area of the microprocessor is markedly increased so as to give rise to the problem that the area efficiency is lowered (Electronics Letters 35, 2185–2187, (1999)).

Also, the reason why the multi-port cache memory was not used in the past can be summarized as follows:

(1) In the conventional general purpose microprocessor, the bandwidth required for the transmission of instructions and data between the cache memory and the processor core is small, with the result that a one-port cache was capable of achieving its objective. On the other hand, if it is necessary to double the bandwidth in a higher performance microprocessor, a one-port cache can be divided into a portion performing, for example, the transmission of program instructions and another portion for transmitting the data for the execution of the program instructions, however, paying the penalty of a higher cache miss rate.

(2) As described above, the chip area is markedly increased in the conventional multi-port cache memory comprising multi-port storage cells as constituents. Therefore, it is highly uneconomical to prepare a multi-port cache memory of a large storage capacity in order to achieve a low cache miss rate.

(3) For forming a multi-port cache memory, a complex wiring is required for transmitting a large number of port addresses and data. Therefore, if a multi-port cache memory having a large area due to the construction from multi-port SRAM cells is formed on a chip separately from the processor core for achieving a hybrid integration on a printed circuit board, the number of process steps is increased because of formation of the complex wiring on the printed circuit board, which is uneconomical.

For avoiding the complexity of the wiring on the printed circuit board, it is desirable for the processor core and the multi-port cache memory to be integrated on the same chip. In this case, however, the problem of the chip area is rendered more serious.

In recent microprocessors, it is possible to execute a plurality of instructions for each clock cycle as in, for example, Pentium II and III by Intel Inc. Such being the situation, it is a serious objective in recent years to increase the number of ports for coping with the large cache access bandwidth and to develop a multi-port cache memory having a small chip area.

As described above, in a conventional multi-port cache memory constructed from multi-port SRAM cells, the area is increased in proportion to the square of the number of ports. Therefore, if the number of ports is increased, the chip area of the microprocessor is markedly increased so as to give rise to the problem that the area efficiency is lowered.

BRIEF SUMMARY OF THE INVENTION

An objective of the present invention, which has been achieved in an attempt to overcome the above-noted problems inherent in the prior art, is to provide a multi-port cache memory having a small area and, thus, is adapted for use in multi-issue microprocessors in the future. To be more specific, the present invention is intended to provide a multi-port cache memory satisfying simultaneously the requirements (1) and (2) given below:

(1) The multi-port cache memory is required to have a very high random access bandwidth for supporting multiple instruction fetches and multiple load/store operations by a processor in every clock cycle.

(2) If a cache miss is generated, a wait time of generally 10 to 20 clock cycles is required for access to the main memory. Therefore, the multi-port cache memory is required to have a small chip area and a large storage capacity in order to achieve a low cache miss rate.

The present invention provides a multi-port cache memory having a large storage capacity and consisting of one-port cell blocks for use in advanced micro-processors which execute a plurality of instructions within the same clock, requiring a large random access bandwidth, and performing the function of access in parallel from a plurality of ports. Also, the multi-port cache memory of the present invention has the merit of markedly decreasing the integration area.

According to a first aspect of the present invention, there is provided a multi-port cache memory, comprising first to K-th N-port tag memories each consisting of M-number of one-port cell blocks and of an N-port decoder for decoding the N cache line indices, each having 1 bit or more, supplied to the first to K-th tag memories, each of K and M being an integer of 1 or more and N being an integer of more than 1; first to K-th N-port data memories each consisting of M-number of one-port cell blocks and of an N-port decoder for decoding the N cache line indices, each having 1 bit or more, and the N cache line offsets, each having 0 bit or more, supplied to the first to K-th data memories; and a conflict management circuit for managing the write and read conflicts in the first to K-th N-port tag memories and the first to K-th N-port data memories.

Desirably, a cache line index consists of a first cache line index for identifying the contents of any one or any plurality of the M-number of one-port cell blocks and a second cache line index for selecting any one or any plurality of the M-number of one-port cell blocks.

More desirably, the multi-port cache memory of the present invention comprises first to K-th comparing circuits for comparing the tags supplied to the first to K-th N-port tag memories with the tags generated from the first to K-th N-port tag memories, respectively, and generates and transmits cache hit signals for each of the N ports by supplying the outputs of the first to K-th comparing circuits to the K-input OR circuits for each of the N ports.

Further more desirably, the outputs of the first to K-th comparing circuits for each of the N ports serve to control first to K-th enable circuits for each of the N ports that permit the input and output of write and read data of the first to K-th data memories for each of the N ports, respectively.

According to a second aspect of the present invention, there is provided an N-port tag memory, comprising an M-number of one-port cell blocks, M being an integer of one or more; a global switching network serving to impart N-port multi-port functions to the M-number of one-port cell blocks, N being an integer of more than one; and connections for a conflict management circuit connected to and controlling the global switching network consisting, for example, of a bus system or a crossbar switch, in the case of access conflicts between the N ports, wherein the outputs of a conflict management circuit and, for each.of the N ports, first cache line indices for identifying the contents of any one or any plurality of the M-number of one-port cell blocks, second cache line indices for selecting any one or any plurality of the M-number of one-port cell blocks, and read/write instructions transmitted from a microcomputer core are supplied to at least the global switching network.

According to a third aspect of the present invention, there is provided an N-port data memory, comprising an M-number of one-port cell blocks, M being an integer of one or more; a global switching network serving to impart an N-port multi-port function to the M-number of one-port cell blocks, N being an integer of more than one; and connections for a conflict management circuit connected to and controlling the global switching network consisting, for example, of a bus system or a crossbar switch, in the case of conflicts between the N ports, wherein the outputs of a conflict management circuit, and, for each of the N ports, first cache line indices for identifying the contents of any one or any plurality of the M-number of one-port cell blocks, second cache line indices for selecting any one or any plurality of the M-number of one-port cell blocks, cache line offsets allowing the cache lines to consist of more than one data word, and read/write instructions transmitted from a microcomputer core are supplied to at least the global switching network, and the instructions or data words are transmitted to or from the global switching network.

According to a fourth aspect of the present invention, there is provided an N-port tag memory, comprising an M-number of one-port cell blocks, M being an integer of one or more; a port transition circuit for converting the function of the one-port cell block to the function of an N-port block, N being an integer more than one; an M-number of N-port blocks the function of which has been obtained by mounting the port transition circuit to each of the M-number of one-port cell blocks; a circuit network performing the address decoding function for connecting N-ports to an M-number of N-port blocks; and connections for a conflict management circuit to control in case of an access conflict the circuit network performing the address decoding function for connecting the M-number of N-port blocks; wherein, for each of the N ports, first cache line indices for identifying the contents of any one or any plurality of the M-number of one-port cell blocks, and read/write instructions from a microcomputer are supplied to at least to each of the port transition circuits, and the outputs of a conflict management circuit, and, for each of the N ports, second cache line indices for selecting any one or any plurality of the M-number of one-port cell blocks, and read/write instructions transmitted from the microcomputer core are supplied to at least the circuit network performing the address decoding function for connecting the M-number of N-port blocks.

Further, according to a fifth aspect of the present invention, there is, provided an N-port data memory, comprising an M-number of one-port cell blocks, M being an integer of one or more; a port transition circuit for converting the function of the one-port cell block to the function of an N-port block, N being an integer more than one; an M-number of N-port blocks the function of which has been obtained by mounting the port transition circuit to each of the M-number of one-port cell blocks; a circuit network performing the address decoding function for connecting N-ports to an M-number of N-port blocks; and connections for a conflict management circuit to control in case of an access conflict the circuit network performing the address decoding function for connecting the M-number of N-port blocks, wherein, for each of the N ports, first cache line indices for identifying the contents of any one or any plurality of the M-number of one-port cell blocks, cache line offsets allowing the cache lines to consist of more than one data word, and read/write instructions from a microcomputer are supplied to at least to each of the port transition circuits and the outputs of a conflict management circuit, and, again for each of the N ports, second cache line indices for selecting any one or any plurality of the M-number of one-port cell blocks, and read/write instructions from a microcomputer core, are supplied to at least the circuit network performing the address decoding function for connecting the M-number of N-port blocks, and data words or instructions are transmitted to and from the circuit network performing the address decoding function of the M-number of N-ports blocks.

In some cases, in each of the N-port tag memories and the N-port data memories, it is advantageous for the number M of one-port cell blocks to be smaller than the number N of ports of the N-port data memories.

It is also in some cases desirable for the N-port tag memory and the N-port data memory to be combined to form a combined N-port tag-data memory, and the word length of the combined N-port tag-data memory to be represented by "mtag+W*$2^{mword}$", where mtag denotes the number of bits of the tags, mword denotes the number of bits, being 0 or more, of the address used for the cache line offsets, and W denotes the word length (number of bits) of an instruction or a data word.

Also, the cell blocks included in each of the N-port tag memories and the N-port data memories may advantageously consist of N-port blocks constructed from L-port storage cells, where the number L is an integer not less than 1 and less than N ($1 \square L<N$). In this case, each of the N-port blocks comprises a port transition circuit for converting the function of a L-port cell block to the function of an N-port cell block.

What should also be noted is that it is possible to construct the N-port blocks in the tag memory from $L_{tag}$-port storage cells ($L_{tag}$ being an integer of one or more), and to construct the N-port blocks in the data memory from $L_{data}$-Port storage cells ($L_{data}$ being an integer of one or more and differing from $L_{tag}$).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows the address division into the tag Atag, the cache line index Aind, the cache line offset Aword and the byte offset Abyte in the conventional multi-port cache memory;

FIG. 4 is a block diagram showing the architecture of a multi-port cache memory of a direct-map scheme according to a first embodiment of the present invention;

FIG. 5A shows the address division into the tag Atag, a 2nd cache line index Aind2, a 1st cache line index Aind1, the cache line offset Aword and the byte offset Abyte in the general case of a multi-port cache memory of the present invention;

FIG. 5B shows a possible address division into the tag Atag, the cache line indices Aind2, Aind1, the cache line offset Aword and the byte offset Abyte of a multi-port cache memory of the present invention in the direct-map scheme for the case of 512 K bit storage capacity and 8 ports;

FIG. 6 is a block diagram showing the architecture of a multi-port cache memory of the 2-way set-associative scheme according to a second embodiment of the present invention;

DETAILED DESCRIPTION OF THE INVENTION

Figure 1:
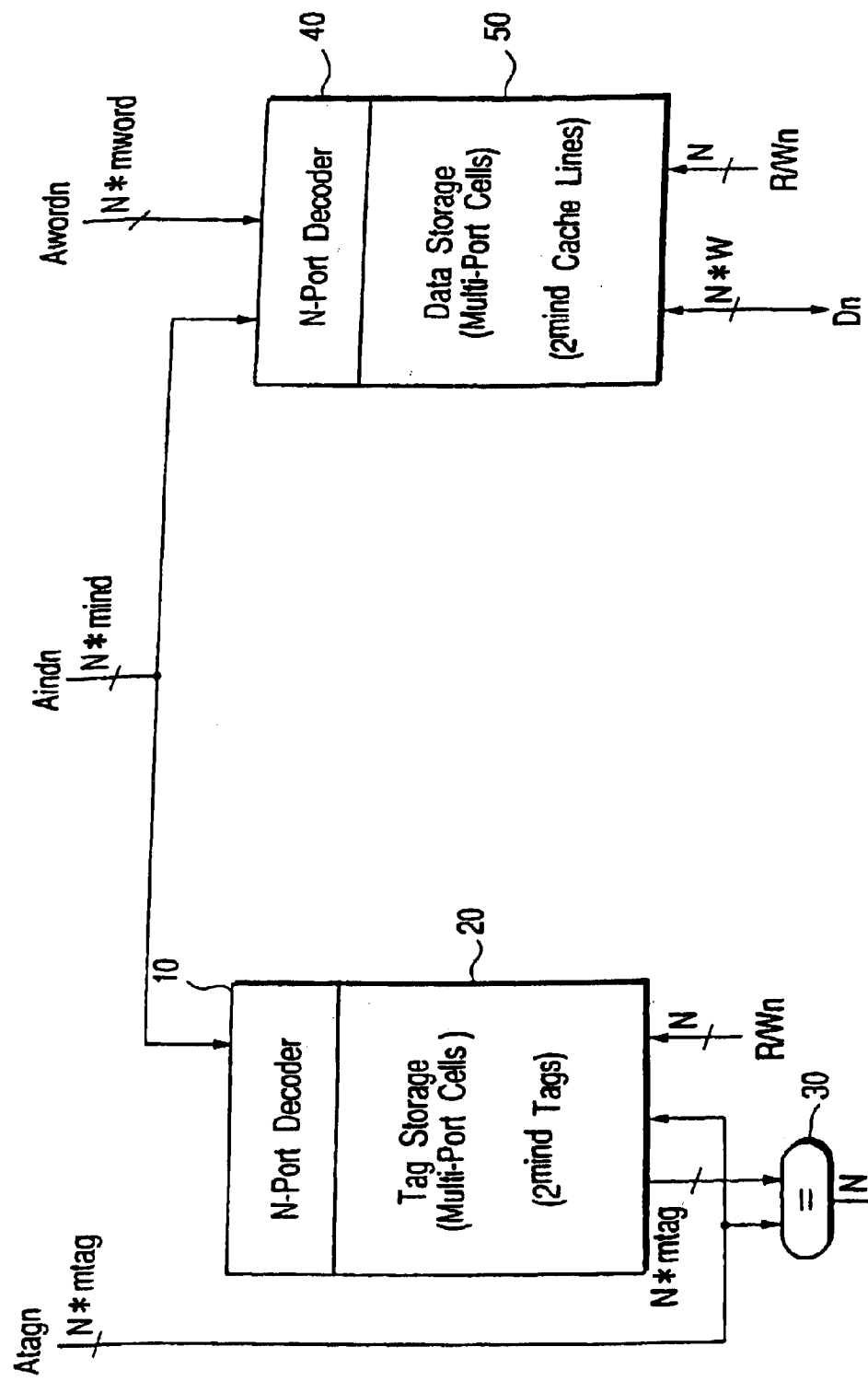
FIG. 1 is a block diagram showing the architecture of a conventional multi-port cache memory of the direct-map scheme without a conflict management circuit.
Figure 2:
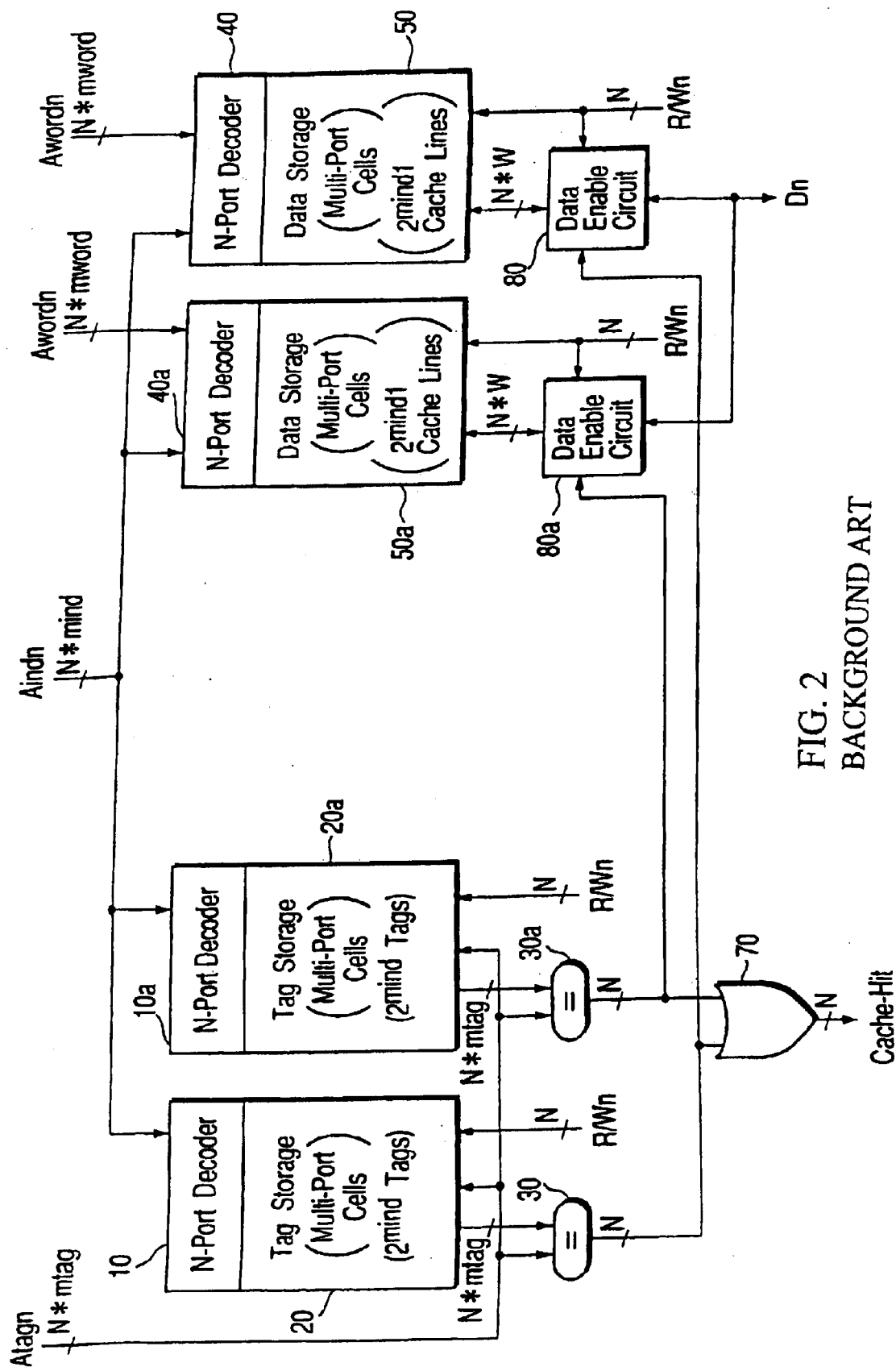
FIG. 2 is a block diagram showing the architecture of a conventional multi-port cache memory of the 2-way set-associative scheme without a conflict management circuit.

Some embodiments of the present invention will now be described with reference to the accompanying drawings.

FIG. 4 shows the construction of a multi-port cache memory of the direct-map scheme according to the first embodiment of the present invention. The multi-port cache memory shown in FIG. 4 comprises, for example, an upper level N-port decoder 1, a tag storage 2 and a cache hit comparing circuit 3 on the tag side and, for example, an upper level N-port decoder 4, a data storage 5 on the data side and a conflict management circuit 6.

A first feature of the multi-port cache memory shown in FIG. 4 resides in that, since each of the tag storage 2 and the data storage 5 is formed of one-port cell blocks, it is possible to avoid the difficulty that the areas of the tag storage 2 and the data storage 5 increase in proportion to the square of the number of ports, which occurs with the conventional multi-port cache memory constructed from multi-port storage cells. Therefore, it is possible to increase the number of ports and the memory storage capacity to make the multi-port cache memory adapted for use in a high performance microprocessor. A second feature of the multi-port cache memory of the present invention resides in that the cache line indices $Aind_n$ can be divided into two kinds of cache line indices $Aind1_n$ and $Aind2_n$, though only one kind of cache line index was used in the conventional multi-port cache memory.

In a conventional multi-port cache memory the cache line index $Aind_n$ directly identifies a cache line in the data memory and a corresponding stored tag in the tag memory, while the tag $Atag_n$ is used together with the identified stored tag to verify that the accessed data line is presently stored in the identified cache line. In a multi-port cache memory of the present invention, while the cache line index $Aind1_n$ is used for identifying a cache line and a stored tag each within one or more cell blocks, the cache line index $Aind2_n$ is used for identifying said cell blocks including said cache line and said stored tag.

Incidentally, the expression "e.g., upper level" in the N-port decoders 1 and 4 on the tag side and the data side, respectively, denotes an N-port decoder which forms the N-port functionality with a plurality of one-port cell blocks. It should be noted that, in the conflict management circuit 6, the cache line index $Aind2_n$ alone is used for the conflict management, and the cache line index $Aind1_n$ is not used for the conflict management. This implies that the construction of the conflict management circuit 6 for detecting a conflict can be simplified.

A third feature of the multi-port cache memory of the present invention resides in that, since a cell block consists for example of a one-port SRAM, it is possible for a read conflict to take place like a write conflict. The read conflict takes place in the case where the cache line stored in the same cell blocks consisting of for example one-port SRAMs is accessed from a plurality of ports of the multi-port cache memory.

The operation of the multi-port cache memory according to the first embodiment of the present invention will now be described in detail. The operation of the multi-port cache memory of the present invention consisting of one-port cell blocks is substantially equal to that of the conventional one-port cache memory or the conventional multi-port cache memory consisting of multi-port storage cells described previously and, thus, the differences in operation between the present invention and the prior art will now be described.

A main difference in operation between the multi-port cache memory of the present invention and the conventional one-port cache memory is that, in the multi-port cache memory of the present invention, it is possible to perform the read and write instructions from and to all the ports in parallel within the same clock cycle. Also, the multi-port cache memory of the present invention differs from the conventional multi-port cache memory in that, in the present invention, it is possible for conflicts between ports to take place in the reading access as in the writing access, leading to a higher probability in the occurrence of an access conflict.

The operation of the multi-port cache memory of the present invention in the cache hit case is similar to that of the conventional multi-port cache memory except the case where a conflict has taken place in the reading access. If a conflict takes place in the reading access, one port alone among the conflicted ports is selected by the conflict management circuit 6 so as to be capable of accessing to the cache memory, and the access of the other ports is rejected. Since the access must be repeated in respect of the port whose access has been rejected, the access of these ports is delayed by one clock cycle.

The writing of the cache memory in the cache hit case is performed by using the write through or write back scheme in order to maintain consistency of the data between the cache memory and the main memory, as in the conventional multi-port cache memory. When a cache miss has taken place, it is necessary to take a copy of the accessed data line from the main memory and to store this copy in a corresponding cache line, which is sometimes also called a cache block. In order to select the cache line that is to be overwritten, applied is, for example, an LRU (Least Recently Used) method in which the cache line that was not used for the longest time is replaced. The copying method into the cache line is equal to that for the conventional cache memory.

Since all the operations of the multi-port cache memory of the present invention except the read operation are similar to the conventional operations, the read operation in the event of the access conflict occurrence will now be described in detail. As described previously, if a conflict takes place among a plurality of ports in the reading access, one port alone among these plural ports is selected by the conflict management circuit 6 so as to be capable of accessing to the cache memory, and the access of the conflicting other ports is rejected. The conflict in the reading step denotes that the access to the same one-port cell blocks is executed from a plurality of ports in the same clock cycle. Incidentally, the tag and data side are managed in parallel in a single access in the conflict management circuit 6.

The access rejection signal of the other ports whose access has been rejected is transmitted to the microprocessor core. For the access of the one port whose access has been permitted, the tag read from the tag memory 2 is compared with the tag $Atag_n$ of the corresponding address. In the event of a cache hit, the corresponding instruction data $D_n$ is transmitted from the data memory 5 to the microprocessor (not shown) in the case of the read operation.

In the event of a cache miss, a new cache line is taken in from the main memory, and an old cache line of the data memory 5 is replaced by the new cache line by using, for example, the LRU method. In this case, the data word $D_n$ taken in from the main memory is transmitted into the microprocessor core, too.

FIGS. 5A and 5B collectively show the address division into the tag Atag, the first cache line index Aind1, the second cache line index Aind2, the cache line offset Aword, and the byte offset Abyte for the access of the multi-port cache memory of the direct-map scheme.

FIG. 5A shows the address division in the general case. On the other hand, FIG. 5B shows a comparison of the address division of the conventional multi-port cache memory and the address division of a multi-port cache memory of the present invention for a 512 K bit multi-port cache memory of the direct-map scheme having an address space and a word length each consisting of 32 bits as well as 8 ports and 4 words per cache line.

In the conventional multi-port cache memory, the cache line index Aind is formed with 12 bits. In a multi-port cache memory of the present invention, however, the data memory consists e.g. of 128 cell blocks each of 4 K bits, while the tag memory consists e.g. of 128 cell blocks each of 480 bits. Consequently the address of the cache line index is divided into a first cache line index Aind1 formed of 7 bits and a second cache line index Aind2 formed of 5 bits.

Incidentally, in the multi-port cache memory shown in FIG. 4, the tag storage 2 and the data storage 5 are formed separately from each other. However, it is possible to combine the tag storage 2 and the data storage 5 into a single storage and the upper level N-port decoders 1 and 4 into a single upper level N-port decoder.

The multi-port cache memory of the 2-way set-associative scheme according to a second embodiment of the present invention will now be described with reference to FIG. 6. Specifically, FIG. 6 shows the architecture of the multi-port cache memory of the 2-way set-associative scheme.

The function of the multi-port cache memory of the direct-map scheme according to the first embodiment of the present invention is expanded in the multi-port cache memory of the 2-way set-associative scheme according to the second embodiment of the present invention. The multi-port cache memory shown in FIG. 6 comprises N-port decoders 1, 1a, tag storages 2, 2a, cache hit comparing circuits 3, 3a and OR gates 7 for generating the final cache-hit signals on the tag side and N-port decoders 4, 4a, data storages 5, 5a, data enable circuits 8, 8a on the data side and a conflict management circuit 6.

The multi-port cache memory of the 2-way set-associative scheme shown in FIG. 6 is similar to the multi-port cache memory of the direct-map scheme shown in FIG. 4, except that the OR gates 7 for transmitting cache hit signals, one for each of the N ports, upon receipt of the results of comparison performed by the cache hit comparing circuits 3 and 3a, and the data enable circuits 8, 8a that permit transmitting the data words $D_n$ between the data bus and the data memories upon receipt of the result of comparison performed by the cache hit comparing circuits 3, 3a are added to the multi-port cache memory shown in FIG. 6.

The first, second and third features of the multi-port cache memory of the direct-map scheme of the present invention have already been described in conjunction with the first embodiment of the present invention. The multi-port cache memory of the 2-way set-associative scheme according to the second embodiment also exhibits all of these features. Also, the address division into the tag Atag, the first cache line index Aind1, the second cache line index Aind2, the cache line offset Aword, and the byte offset Abyte in the access to the cache memory is also similar to that shown in FIG. 5A.

The direct-map scheme shown in FIG. 4 and the 2-way set-associative scheme shown in FIG. 6 are discernable by the number of data lines from the main memory having the same index but differing from each other in the tag, which can be present simultaneously in the cache memory. The number of data lines with the same index but a different tag, which can be present simultaneously in the cache memory, is 1 in the direct-map scheme, 2 in the 2-way set-associative scheme, and 3 in the 3-way set-associative scheme and so on.

In general the k-way set-associative scheme expands the number of pairs each consisting of the tag storage 2 and the data storage 5 and their respective upper level N-port decoders 1 and 4 to K pairs (K being an integer of one or more). FIGS. 4 and 6 correspond to the cases where K is 1 and 2, respectively. Also, in the general set-associative scheme consisting of a plurality of such pairs, it is possible to combine each pair of tag storage and data storage plus upper level N-port decoders into one tag-data storage and one upper level N-port decoder.

A third embodiment of the present invention, which specifies a possible realization of the multi-port function in detail, will now be described with reference to FIG. 7. The multi-port function of the multi-port cache memory consisting of one-port cell blocks can be realized by using the circuits described previously in conjunction with the first and second embodiments and in addition the circuits described in FIG. 7 for the part of the data memory, consisting of the data storage and the upper level N-port decoder.

Figure 7:
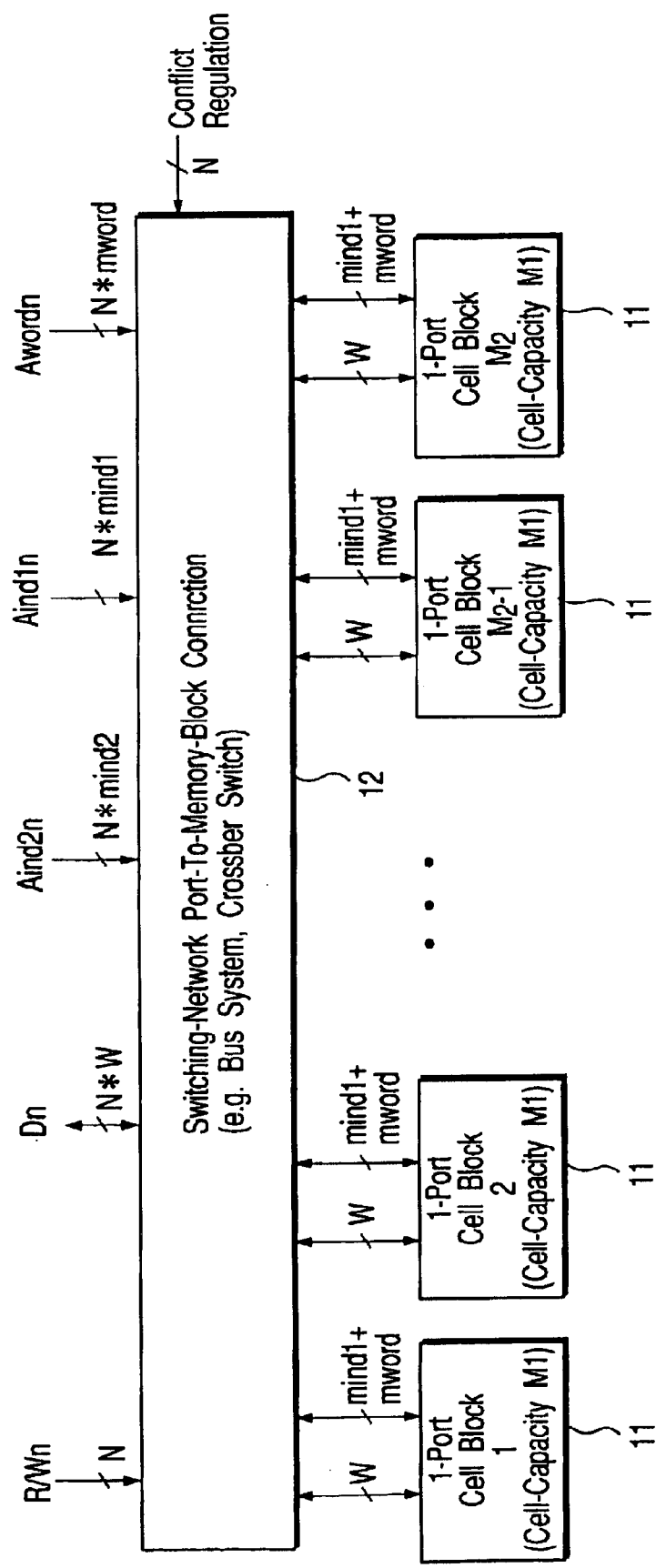
FIG. 7 is a block diagram showing an architecture of a tag-memory or a data-memory for a multi-port cache memory using a switching network multi-port memory scheme according to a third embodiment of the present invention.

In the architecture for the multi-port function shown in FIG. 7, the multi-port function is realized by using one-port cell blocks 11 formed from, for example, SRAM blocks 1 to M2 having, for example, a cell capacity M1 and a global switching network 12 consisting of, for example, a bus system or a cross bar switch for transmitting input-output data and a suitable controller for the dynamic interconnection between the ports and the one-port cell blocks, which may change in every clock cycle.

In the case of using the particular architecture of FIG. 7, it is possible to selectively control efficiently a large amount of interconnection wiring for the ports by using, for example, a crossbar switch, making it possible to form easily a multi-port cache memory having a large capacity and many ports simultaneously.

Incidentally, FIG. 7 shows the constituents and kinds of input/output signals of a multi-port data memory consisting of a plurality of one-port cell blocks plus the corresponding upper level N-port decoder. It should be noted that, if the cache line offsets $Aword_n$ and the data words $D_n$ are deleted, it is possible to obtain the architecture of the multi-port tag memory including its upper level N-port decoder. Also, if the function of controlling the cache line offsets $Aword_n$ and the data words $D_n$ are added to the global switching network 12, it is possible to realize a multi-port cache memory in which the tag storage, the data storage and their respective upper level N-port decoders are made integral in the multi-port architecture shown in FIG. 7.

Incidentally, it is possible to extend the architecture of FIG. 7 with a single global switching network 12 to an architecture with multiple global switching networks. In this case N-port tag memory and N-port data memory, both comprise an $M_B$-number of one-port cell blocks, where $M_B$ is represented by $M*M_S$, each of $M_S$ and M being an integer of one or more; an $M_S$ number of global switching networks each serving to impart N-port functions to an M-number of one-port cell blocks, N being an integer of more than one; and an $M_S$-number of connections for conflict management circuits connected to and controlling the $M_S$ global switching networks.

A fourth embodiment of the present invention, which specifies a different realization of the multi-port function in detail, will now be described with reference to FIG. 8. The multi-port function of the multi-port cache memory consisting of one-port cell blocks can be realized by using the circuits described previously in conjunction with the first and second embodiments and the multi-port architecture shown in FIG. 8.

Figure 8:
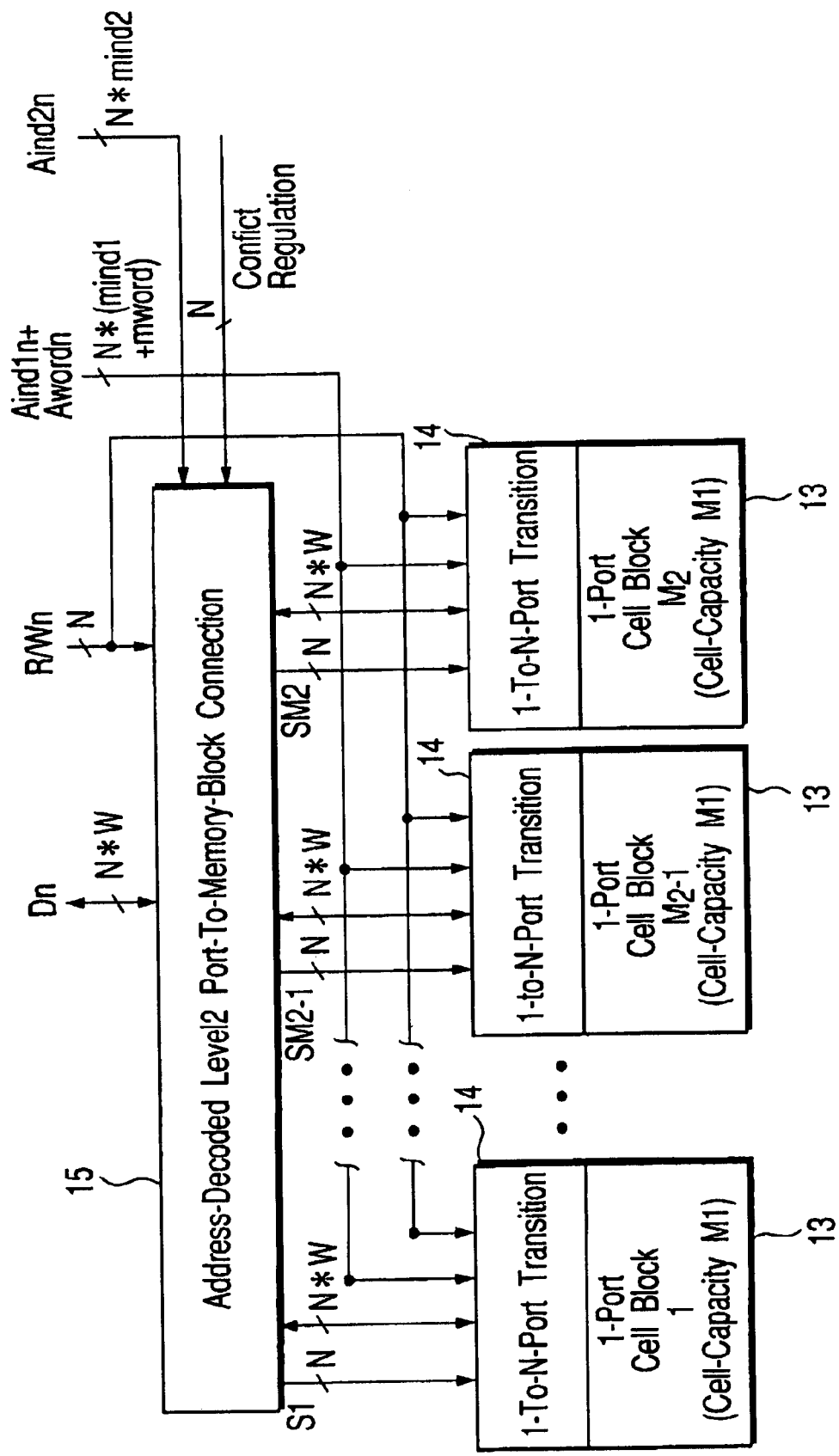
FIG. 8 is a block diagram showing an architecture of a tag-memory or a data-memory for a multi-port cache memory using a hierarchical architecture multi-port memory scheme according to a fourth embodiment of the present invention.

The architecture of the multi-port function shown in FIG. 8 comprises one-port cell blocks 13 of cell blocks 1 to M2 constructed, for example, from SRAM cells having, for example, a cell capacity M1, transition circuits 14 between one-port and N-ports, which are mounted to every one-port cell block 13, an address-decoded level 2 port-to-memory-block connection 15, and a conflict management circuit (not shown).

In the architecture of the multi-port function shown in FIG. 8, the transition between one-port and N-ports at a hierarchy level 1 is performed by using the transition circuit 14, and at a hierarchy level 2 the port-to-memory block connection 15 of the one-port blocks converted into N-port blocks is performed by using a circuit network equipped with the address decoding function for a plurality of N-ports. The particular hierarchical multi-port architecture exhibits a regularity that permits easy expansion of the number of memory blocks and the number of ports and, thus, is practically adapted for preparation of a modular and regular integration structure.

FIG. 8 shows the constituents of a multi-port data memory including its upper level N-port decoder consisting of a plurality of one-port cell blocks and the corresponding kinds of input/output signals. If the cache line offsets $Aword_n$ and the data words $D_n$ are deleted, a multi-port tag memory including its upper level N-port decoder can be formed as in the third embodiment described previously. Also, if the function of controlling the cache line offsets $Aword_n$ and the data words $D_n$ are added to the level 2 port-and-memory connection 15, it is possible to realize a multi-port cache memory in which the tag memory, the data memory and their respective upper level N-port decoders are made integral in the architecture shown in FIG. 8.

Incidentally, it is possible to extend the architecture of FIG. 8 with a single circuit network 15 performing the address decoding function for connecting N-ports to an M-number of N-port blocks to an architecture with multiple circuit networks. In this case N-port tag memory and N-port data memory, both comprise an $M_B$-number of one-port cell blocks, where $M_B$ is represented by $M*M_S$, each of $M_S$ and M being an integer of one or more; a port transition circuit for converting the function of the one-port cell block to the function of an N-port block, N being an integer more than one; an $M_B$-number of N-port blocks the function of which has been obtained by mounting the port transition circuit to each of the $M_B$-number of one-port cell blocks; and $M_S$ number of circuit networks performing the address decoding function for connecting N ports to an M-number of N-port blocks; and an $M_S$-number of connection for conflict management circuits to control in case of an access conflict the circuit network performing the address decoding function for connecting the M-number of N-port blocks.

A fifth embodiment of the present invention will now be described with reference to FIG. 9 as well as FIG. 10. In the fifth embodiment, a comparison between a simulation and actual design data as well as a comparison between the multi-port cache memory of the present invention and the conventional multi-port cache memory will be explained in respect of the area reduction factor as well as the optimum design to minimize the cache-miss and access-conflict probabilities and to maximize the area reduction factor.

Figure 9:
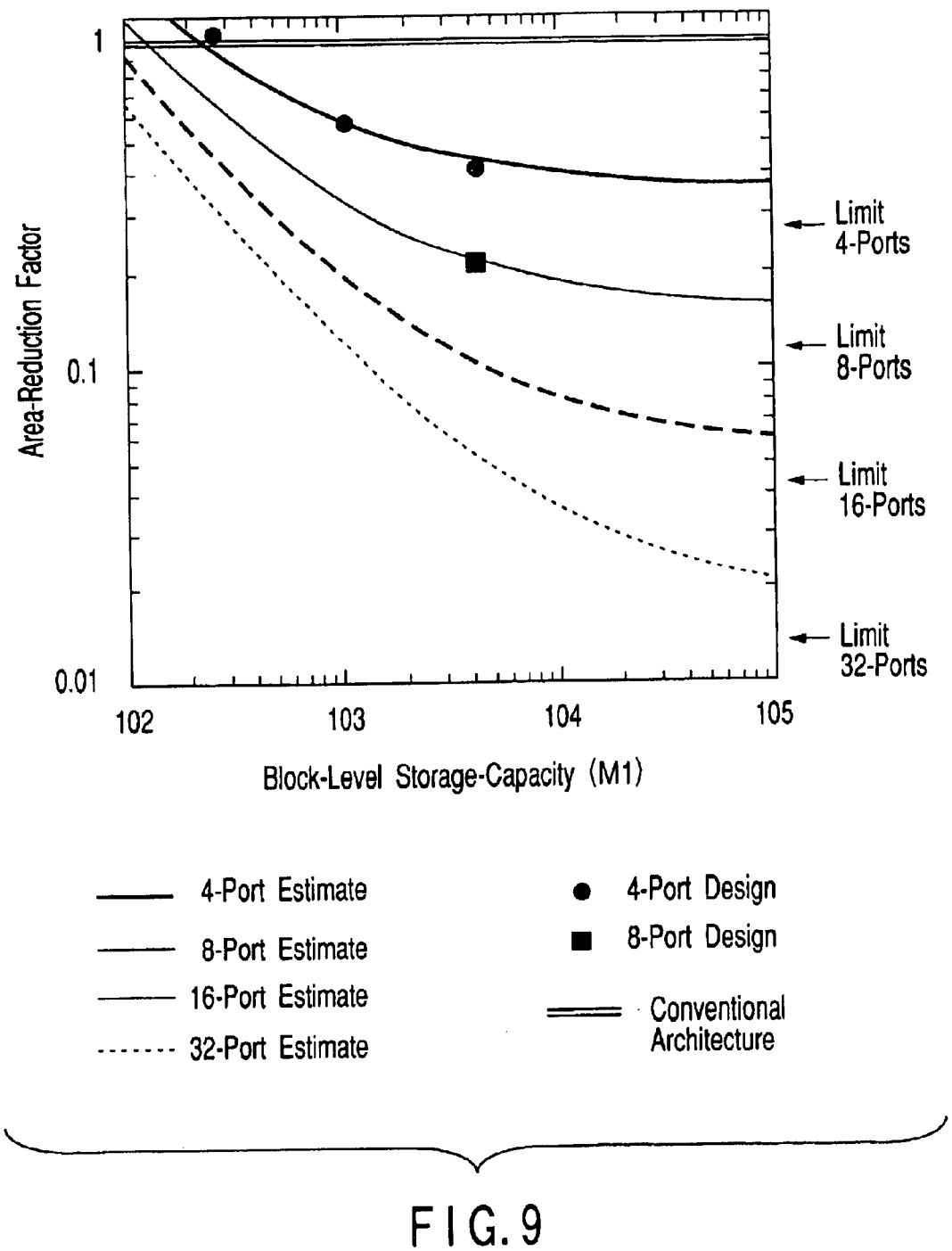
FIG. 9 is a graph showing the relationship between the storage capacity of a 1-port memory cell block and the area reduction factor achievable with a hierarchical multi-port memory scheme as a function of the number of ports according to a fifth embodiment of the present invention.

FIG. 9 is a graph in which the area reduction factor of the data memory section and the area reduction factor of the tag memory section, both constituting the multi-port cache memory of the present invention are plotted as a function of the memory capacity M1 at the one-port cell block level. The curves in the graph represent the simulation, and the black dots and black squares in the graph represent actual design data. Further, the double straight line denotes that these values are normalized by the value of the conventional multi-port cache memory. The area reduction factors of $<\frac{1}{2}$, $<\frac{1}{5}$, $<\frac{1}{14}$ and $<\frac{1}{30}$ are expected in respect of the number of ports of 4, 8, 16 and 32, respectively.

Figure 10:
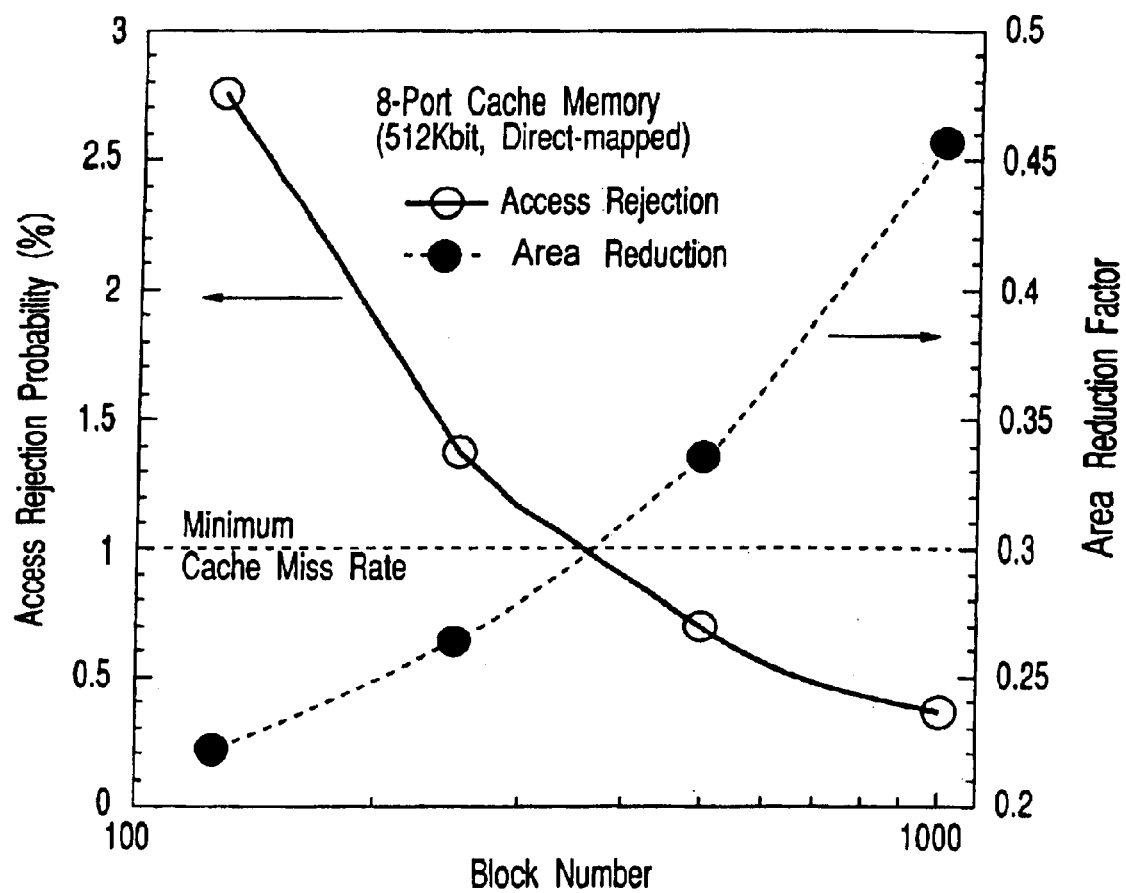
FIG. 10 is a graph showing the trade off among the number of 1-port blocks, the cache miss probability, the access rejection probability and the area reduction factor in the data memory of an 8-port cache memory of the direct-map scheme according to the fifth embodiment of the present invention.

FIG. 10 is a graph showing the trade off between the access rejection probability and the area reduction factor in respect of the cache memory of the direct-map scheme of the present invention having the architecture of 32 bits×16 K words, the storage capacity of 512 K bits and 8 ports. In the example of an embodiment of the present invention as a 8-port cache memory, an area reduction by a factor from $\frac{1}{3}$ to $\frac{1}{4}$ can be obtained, compared with the conventional 8-port cache memory, by making the access rejection probability equal to the cache miss probability.

The present invention is not limited to the embodiments described above. For example, the multi-port cache memory of the present invention can also be applied to a hierarchical organization of the cache memories such as the small storage capacity first level cache L1 and the large storage capacity second level cache L2. Particularly, in the second level cache L2, the local probability of a cache miss is usually very high (about 20% to 40%). A multi-port cache L2 of the present invention is especially desirable in this case because a high access rejection probability is allowed and the merit of the area reduction is exhibited most prominently in the case of such a high cache miss probability.

In the multi-port cache memory of the present invention, the tag memory and the data memory are shown in the drawings as two different memories. However, it is possible to combine the tag memory, the data memory and their respective upper level N-port decoders to form a single memory having the word length of $mtag+W*2^{mword}$. In this case, the single memory becomes especially useful in the case of mword =0, i.e., in the case where the cache line includes only one word.

Also, in the N-port cache memory of the present invention, it has been described that the cell blocks included in the tag memory and the data memory are constructed from one-port cells. However, a cell block is not necessarily limited to the construction from one-port cells. It is also possible to construct the cell blocks in the tag memory and the data memory from storage cells which have L ports ($1 \square L < N$, L being an integer) such as 2 ports or 3 ports.

In this case, it is possible to obtain the merit that the conflict probability can be lowered, compared with the construction from one-port cells. On the other hand, the chip area is increased to some extent. In this case, a transition circuit from L-ports to N-ports is required in place of the transition circuit from one-port to N-ports.

Furthermore, in a cache memory of the present invention, it is possible to form the tag memory and the data memory by using cell blocks constructed from storage cells differing from each other in the number of ports. To be more specific, it is possible to form the tag memory by using cell blocks constructed from storage cells with $L_{tag}$-ports ($L_{tag}$ being an integer of one or more) and to form the data memory by using cell blocks constructed from storage cells with $L_{data}$-ports ($L_{data}$ being an integer of one or more differing from $L_{tag}$). In this case, the tag memory and the data memory can be optimized separately for maximum area reduction and minimum conflict probability, which is useful because their total storage capacities are usually different.

Also, it is possible to provide a multi-port cache memory of a mixed type, in which the data memory section is formed by using the one-port cell blocks as in the present invention, and the tag memory section is formed by using the conventional multi-port storage cells.

Each of the embodiments described above covers mainly the case where the number of one-port cell blocks constituting the multi-port tag memory and the multi-port data memory is larger than the number of ports. However, the present invention is not limited to the case where the number of blocks is larger than the number of ports. On the contrary, many useful effects as, for example, a very small integration area are expected even in the case where the number of blocks is less than the number of ports. Further, the present invention can be modified in various ways within the technical scope of the present invention.

The multi-port cache memory of the present invention, which consists of one-port memory cell blocks as described above, produces the following three merits relative to an advanced microprocessor in which a plurality of instructions are executed within a single clock cycle:

(1) The performance of the microprocessor can be fully exhibited by expanding the random access bandwidth of the cache. The expansion of the random access bandwidth is absolutely necessary for the microprocessor to execute a plurality of instruction fetches, data loads and data stores within a single clock cycle.

(2) While new data lines are inserted into the cache from the main memory by using one port or a plurality of the ports of the cache, the processor core is capable of continuing to execute the program with the remaining ports. Therefore, it is possible to decrease the cache-miss penalties by using the hit-under-miss scheme, the miss-under-miss scheme or the write-back scheme. It is also possible to avoid the cache misses by pre-fetching those data lines from the main memory, which the processor will need in near future.

(3) By using the multi-port cache memory of the present invention consisting, for example, of one-port SRAM cell blocks, it is possible to reduce markedly the integration area, compared with the case of using the conventional multi-port cache memory.

The multi-port cache memory of the present invention is defective in that the access rejection probability of the multi-port cache memory is higher. However, although the requirement of waiting time of only one clock cycle is the penalty of the access rejection, the penalty of the cache miss reaches 10 to 20 clock cycles. It follows that the access rejection probability is permitted to have a value appropriately larger than the cache miss probability. Therefore, it is possible to optimize the design of the multi-port cache memory of the present invention by clarifying the trade off between the access rejection probability, the cache miss probability and the area reduction. If the multi-port cache memory of the present invention thus optimized is used, it is possible to obtain a tremendous area reduction effect with the penalty of a very small degradation of performance, compared with the case of using the conventional multi-port cache memory.

Figure 11:
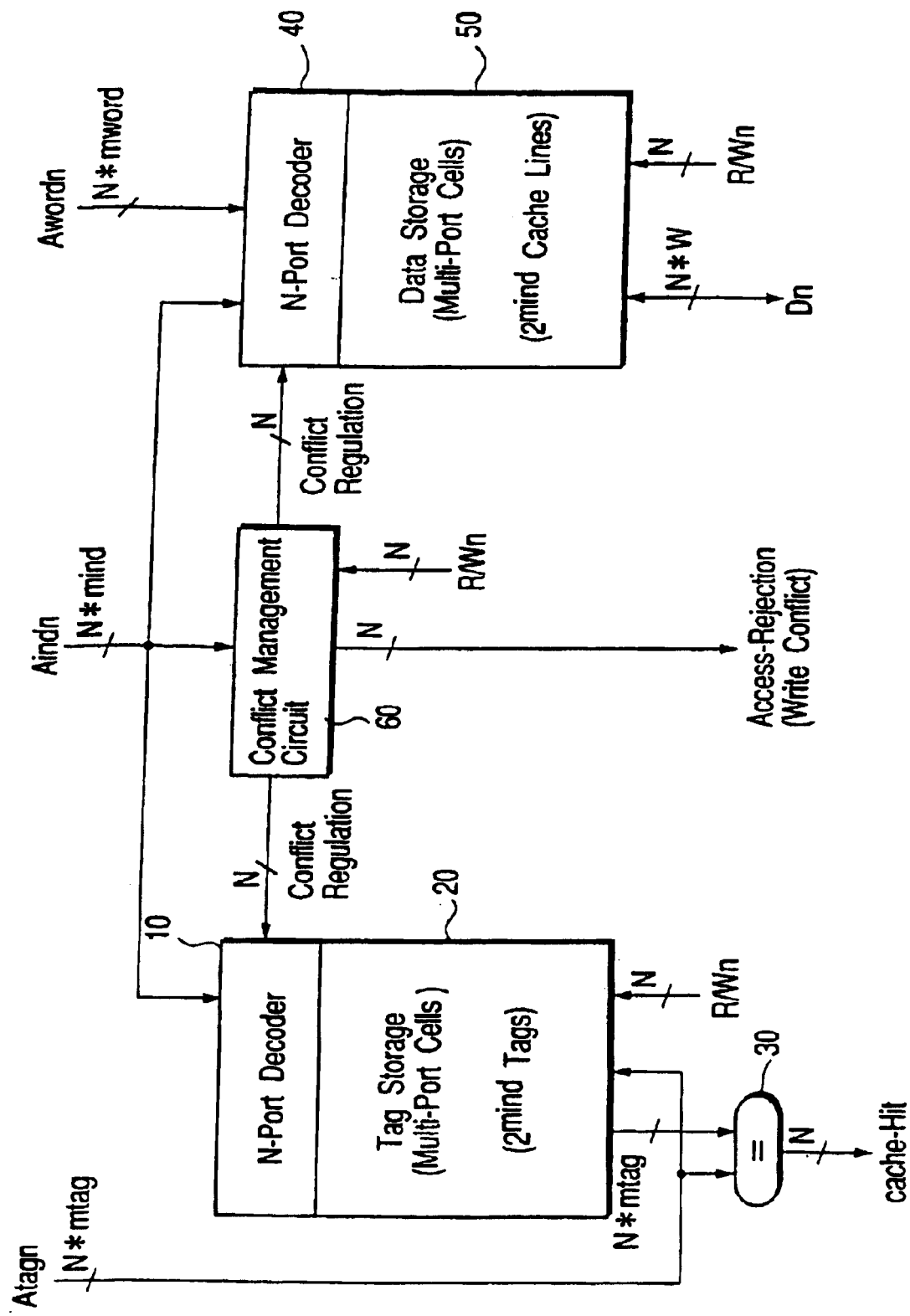
FIG. 11 is a block diagram showing the architecture of an alternative embodiment of a multi-port cache memory of the direct-map scheme with a conflict management circuit.

Another embodiment of Applicants' invention, including a multi-port cache memory, is shown in FIG. 11. Like the background art of FIG. 1, this embodiment comprises a cache-hit comparing circuit 30 and a tag memory consisting of an N-port decoder 10 and a tag storage 20 on the side of the tag, a data memory consisting of an N-port decoder 40 and a data storage 50 on the side of the data. However, this embodiment differs from the background art of FIG. 1 in that this embodiment also includes a conflict management circuit 60. Tag storage 20 and data storage 50 are constructed from multi-port storage cells (e.g. multi-port SRAM cells). It is possible to store $2^{mind}$ tags in the tag memory. Also, $2^{mind}$ cache lines are included in the data memory.

In executing a cache access from a port, the internal identification of the cache memory is performed with a tag, a cache line index and a cache line offset. The tag, cache line index and cache line offset (data word) for the n-th port are represented by $Atag_n$, $Aind_n$, and $Aword_n$, respectively. Also, the number of address bits used for the tag is represented by mtag, the number of address bits used for the cache line index is represented by mind, and the number of address bits used for the cache line offset is represented by mword. Further, the number of ports of the tag memory and the data memory is represented by N.

The tags $Atag_n$ for the N ports are transmitted through a N*mtag bit wide bus into the tag memory, and the cache line indices $Aind_n$ of N*mind bits are transmitted into the N-port decoder 10 of the tag memory so as to compare the tags of the accessed data lines to the tags of the data lines stored in the data memory of the cache under the line indices $Aind_n$. The comparison is made in a cache-hit-comparing circuit 30. If the tags $Atag_n$ are found to agree with the corresponding tags stored under the line indices $Aind_n$, corresponding cache hit signals are transmitted into the data bus. If any of the tags $Atag_n$ do not agree with the corresponding tags stored under the line indices $Aind_n$, the respective access operations are processed as cache-misses. Incidentally, the symbol $R/W_n$ shown in FIG. 1 represents read and write instructions transmitted from the processor core (not shown).

Also, the cache line indices $Aind_n$ of the N ports of N*mind bits and the cache line offsets $Aword_n$ of N*mword bits are transmitted through the address bus into the N-port decoder 40 of the data memory. In the case of cache hits, the data words $D_n$ are transmitted between the cache lines identified by the line indices $Aind_n$ in the data memory and the processor core. The merit that a cache line has more than 1 data word can be realized by using the cache line offsets $Aword_n$ added to the addresses of the data memory.

In conflict management circuit 60, write conflicts of the cache line indices $Aind_n$ of the N ports are detected so as to reject the access of all but one of the conflicting ports and to transmit respective access rejection signals to the data bus. Incidentally, in the multi-port cache memory shown in FIG. 11, the tag memory and the data memory are separated from each other. However, it is possible to combine the tag memory and the data memory into one tag-data memory.

An example of a multi-port cache memory of a 2-way set-associative scheme will now be described with reference to FIG. 12. The multi-port cache memory of the 2-way set-associative scheme is an extension of the direct-map scheme described above.

Figure 12:
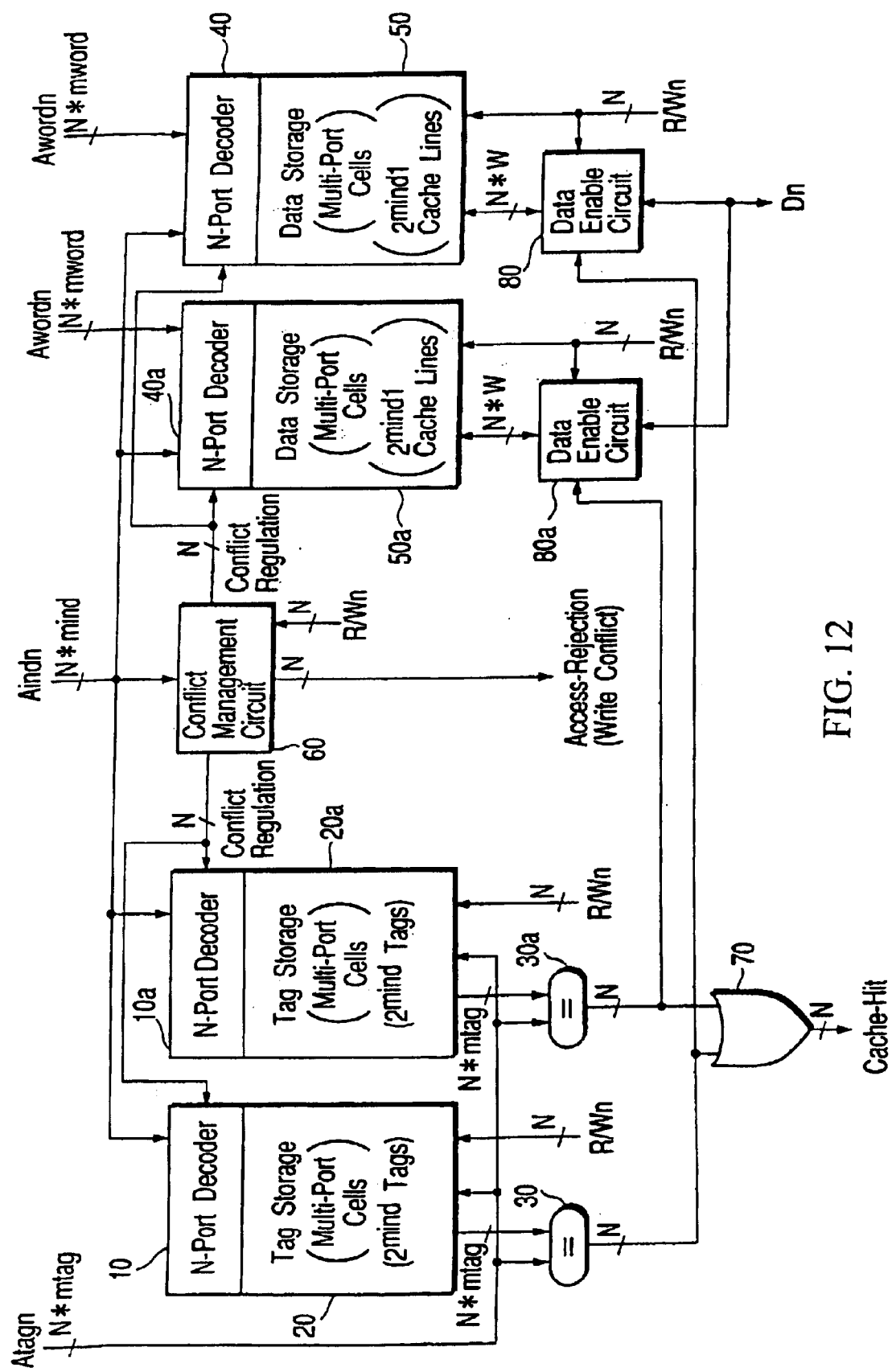
FIG. 12 is a block diagram showing the architecture of an alternative multi-port cache memory of the 2-way set-associative scheme with a conflict management circuit.

The multi-port cache memory shown in FIG. 12 comprises N-port decoders 10, 10a, tag storages 20, 20a, forming 2 tag memories, cache hit comparing circuits 30, 30a, and OR gates 70 inputting the results of comparison on the side of the tag and N-port decoders 40, 40a, data storages 50, 50a, forming 2 data memories, and data enable circuits 80, 80a on the side of the data and a conflict management circuit 60. Each of the tag storages 20, 20a and the data storages 50, 50a is formed from multi-port -storage cells.

The multi-port cache memory of the 2-way set-associative scheme shown in FIG. 12 performs functions similar to those performed by the multi-port cache memory of the direct-map scheme shown in FIG. 11, except that the OR gates 70 for transmitting cache hit signals upon receipt of the results of comparison performed in the cache hit comparing circuits 30, 30a and the data enable circuits 80, 80a which permit transmitting the data words $D_n$ between the data bus and the data memories upon receipt of the results of comparison performed in the cache-hit-comparing circuits 30, 30a are added to the multi-port cache memory of the 2-way set-associative scheme shown in FIG. 12. Therefore, the corresponding components of the multi-port memories are denoted by the same reference numerals so as to avoid an overlapping description.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A multi-port cache memory, comprising:
   first to K-th N-port tag memories each comprising M-number of one-port cell blocks and of an N-port decoder for decoding N cache line indices, each of the cache line indices having 1 bit or more, supplied to the first to K-th tag memories, each of K and M being an integer of 1 or more and N being an integer of more than 1;
   first to K-th N-port data memories each comprising M-number of one-port cell blocks and an N-port decoder for decoding the N cache line indices, each of the cache line indices having 1 bit or more, and N cache line offsets supplied to the first to K-th data memories, each of the cache line offsets having 0 bits or more; and
   a conflict management circuit for managing write and read conflicts in the first to K-th N-port tag memories and the first to K-th N-port data memories.

2. The multi-port cache memory according to claim 1, wherein a cache line index comprises a first cache line index for identifying the contents of any one or any plurality of the M-number of one-port cell blocks and a second cache line index for selecting any one or any plurality of the M-number of one-port cell blocks.

3. The multi-port cache memory according to claim 2, wherein said multi-port cache memory comprises first to K-th comparing circuits for comparing tags supplied to the first to K-th N-port tag memories with tags generated from the first to K-th N-port tag memories, respectively, and a cache hit signal is transmitted for each of the N ports by supplying the outputs of the first to K-th comparing circuits to a K-input OR circuit for each of the N ports.

4. The multi-port cache memory according to claim 3, wherein the outputs of said first to K-th comparing circuits control first to K-th enable circuits that permit the input and output of write data and read data in and out of said first to K-th data memories.

5. The multi-port cache memory according to claim 4, wherein the number M of said one-port cell blocks is less than the number N of ports of said N-port tag memories and said N-port data memories.

6. The multi-port cache memory according to claim 4, wherein corresponding pairs of said N-port tag memories and said N-port data memories are combined to form combined N-port tag-data memories, and the word length of said combined N-port tag-data memories is represented by "mtag+W*$2^{mword}$" where mtag represents the number of bits of an address allocated to a tag, mword represents the number of bits of an address allocated to a cache line offset, mword being 0 or more, and W represents the word length of an instruction or a data word.

7. The multi-port cache memory according to claim 4, wherein said cell blocks included in said N-port tag memories and said N-port data memories comprise L-port cell blocks having the number L of ports not less than 1 and less than N (1<L<N, L being an integer).

8. The multi-port cache memory according to claim 4, wherein said tag memories comprise $L_{tag}$-port cell blocks having the number $L_{tag}$ of ports ($L_{tag}$ being an integer not less than one), and said data memories comprise $L_{data}$-port cell blocks having the number $L_{data}$ of ports ($L_{data}$ being an integer not less than one and differing from $L_{tag}$).

9. The multi-port cache memory according to claim 3, wherein the number M of said one-port cell blocks is less than the number N of ports of said N-port tag memories and said N-port data memories.

10. The multi-port cache memory according to claim 3, wherein corresponding pairs of said N-port tag memories and said N-port data memories are combined to form combined N-port tag-data memories, and the word length of said combined N-port tag-data memories is represented by "mtag+W*$2^{mword}$" where mtag represents the number of bits of an address allocated to a tag , mword represents the number of bits of an address allocated to cache line offset, mword being 0 or more, and W represents the word length of an instruction or a data word.

11. The multi-port cache memory according to claim 3, wherein said cell blocks included in said N-port tag memories and said N-port data memories comprise L-port cell blocks having the number L of ports not less than 1 and less than N (1<L<N, L being an integer).

12. The multi-port cache memory according to claim 3, wherein said tag memories comprise $L_{tag}$-port cell blocks having the number $L_{tag}$ of ports ($L_{tag}$ being an integer not less than one), and said data memories comprise $L_{data}$-port cell blocks having the number $L_{data}$ of ports ($L_{data}$ being an integer not less than one and differing from $L_{tag}$).

13. The multi-port cache memory according to claim 2, wherein the number M of said one-port cell blocks is less than the number N of ports of said N-port tag memories and said N-port data memories.

14. The multi-port cache memory according to claim 2, wherein corresponding pairs of said N-port tag memories and said N-port data memories are combined to form combined N-port tag-data memories, and the word length of said combined N-port tag-data memories is represented by "mtag+W*$2^{mword}$" where mtag represents the number of bits of an address allocated to a tag, mword represents the number of bits of an address allocated to a cache line offset, mword being 0 or more, and W represents the word length of an instruction or a data word.

15. The multi-port cache memory according to claim 2, wherein said cell blocks included in said N-port tag memories and said N-port data memories comprise L-port cell blocks having the number L of ports not less than 1 and less than N (1<L<N, L being an integer).

16. The multi-port cache memory according to claim 2, wherein said tag memories comprise $L_{tag}$-port cell blocks having the number $L_{tag}$ of ports ($L_{tag}$ being an integer not less than one), and said data memories comprise $L_{data}$-port cell blocks having the number $L_{data}$ of ports ($L_{data}$ being an integer not less than one and differing from $L_{tag}$).

17. The multi-port cache memory according to claim 1, wherein the multi-port cache memory comprises first to K-th comparing circuits for comparing tags supplied to the first to K-th N-port tag memories with tags generated from the first to K-th N-port tag memories, respectively, and a cache hit signal is transmitted for each of the N ports by supplying the outputs of the first to K-th comparing circuits to a K-input OR circuit for each of the N ports.

18. The multi-port cache memory according to claim 17, wherein the outputs of said first to K-th comparing circuits control first to K-th enable circuits that permit the input and output of write data and read data in and out of said first to K-th data memories.

19. The multi-port cache memory according to claim 18, wherein the number M of said one-port cell blocks is less than the number N of ports of said N-port tag memories and said N-port data memories.

20. The multi-port cache memory according to claim 18, wherein corresponding pairs of said N-port tag memories and said N-port data memories are combined to form combined N-port tag-data memories, and the word length of said combined N-port tag-data memories is represented by "mtag+W*$2^{mword}$" where mtag represents the number of bits of an address allocated to a tag, mword represents the number of bits of an address allocated to a cache line offset, mword being 0 or more, and W represents the word length of an instruction or a data word.

21. The multi-port cache memory according to claim 18, wherein said cell blocks included in said N-port tag memories and said N-port data memories comprise L-port cell blocks having the number L of ports not less than 1 and less than N (1<L<N, L being an integer).

22. The multi-port cache memory according to claim 18, wherein said tag memories comprise $L_{tag}$-port cell blocks having the number $L_{tag}$ of ports ($L_{tag}$ being an integer not less than one), and said data memories comprise $L_{data}$-port cell blocks having the number $L_{data}$ of ports ($L_{data}$ being an integer not less than one and differing from $L_{tag}$).

23. The multi-port cache memory according to claim 17, wherein the number M of said one-port cell blocks is less than the number N of ports of said N-port tag memories and said N-port data memories.

24. The multi-port cache memory according to claim 17, wherein corresponding pairs of said N-port tag memories and said N-port data memories are combined to form combined N-port tag-data memories, and the word length of said combined N-port tag-data memories is represented by "mtag+W*$2^{mword}$" where mtag represents the number of bits of the address allocated to the tag, mword represents the number of bits of an address allocated to a cache line offset, mword being 0 or more, and W represents the word length of an instruction or a data word.

25. The multi-port cache memory according to claim 17, wherein said cell blocks included in said N-port tag memories and said N-port data memories comprise L-port cell blocks having the number L of ports not less than 1 and less than N (1<L<N, L being an integer).

26. The multi-port cache memory according to claim 17, wherein said tag memories comprise $L_{tag}$-port cell blocks having the number $Lt_{ag}$ of ports ($Lt_{ag}$ being an integer not less than one), and said data memories comprise $L_{data}$-port cell blocks having the number $L_{data}$ of ports ($L_{data}$ being an integer not less than one and differing from $L_{tag}$).

27. The multi-port cache memory according to claim 1, wherein the number M of said one-port cell blocks is less than the number N of ports of said N-port tag memories and said N-port data memories.

28. The multi-port cache memory according to claim 1, wherein corresponding pairs of said N-port tag memories and said N-port data memories are combined to form combined N-port tag-data memories, and the word length of said combined N-port tag-data memories is represented by "mtag+W*$2^{mword}$" where mtag represents the number of bits of an address allocated to a tag, mword represents the number of bits of the address allocated to a cache line offset, mword being 0 or more, and W represents the word length of an instruction or a data word.

29. The multi-port cache memory according to claim 1, wherein said cell blocks included in said N-port tag memories and said N-port data memories comprise L-port cell blocks having the number L of ports not less than 1 and less than N (1<L<N, L being an integer).

30. The multi-port cache memory according to claim 1, wherein said tag memories comprise $L_{tag}$-port cell blocks having the number $L_{tag}$ of ports ($L_{tag}$ being an integer not less than one), and said data memories comprise $L_{data}$-port cell blocks having the number $L_{data}$ of ports ($L_{data}$ being an integer not less than one and differing from $L_{tag}$).

31. An N-port tag memory, comprising:
   an M-number of one-port cell blocks, M being an integer of one or more;
   a global switching network including a bus system, a crossbar switch or a multistage connection network, serving to impart N-port multi-port functions to the M-number of one-port cell blocks, N being an integer of more than one; and
   connections for a conflict management circuit connected to control the global switching network in the case of access conflicts between the N-ports,
   wherein the outputs of a conflict management circuit, for each of the N ports, a first cache line index for identifying the contents of any one or any plurality of the M-number of one-port cell blocks, a second cache line index for selecting any one or any plurality of the M-number of one-port cell blocks, and a read/write instruction transmitted from a microcomputer core are supplied to at least the global switching network.

32. The N-port tag memory according to claim 31, wherein the number M of said one-port cell blocks is less than the number N of ports of said N-port tag memory.

33. The N-port tag memory according to claim 31, wherein said N-port tag memory and an N-port data memory are combined to form a combined N-port tag-data memory, and the word length of said combined N-port tag-data memory is represented by "mtag+W*$2^{mword}$" where mtag represents the number of bits of an address allocated to a tag, mword represents the number of bits of an address allocated to a cache line offset, mword being 0 or more, and W represents the word length of an instruction or a data word.

34. The N-port tag memory according to claim 31, wherein said cell blocks included in said N-port tag memory are L-port cell blocks having the number L of ports not less than 1 and less than N (1<L<N, L being an integer).

35. The N-port tag memory according to claim 31, wherein said tag memory comprises $L_{tag}$-port cell blocks having the number $L_{tag}$ of ports ($L_{tag}$ being an integer not less than one), and an N-port data memory forming a pair with said N-port tag memory comprises $L_{data}$-port cell blocks having the number $L_{data}$ of ports ($L_{data}$ being an integer not less than one and differing from $L_{tag}$).

36. An N-port data memory, comprising:
   an M-number of one-port cell blocks, M being an integer of one or more;
   a global switching network including a bus system, a crossbar switch or a multistage connection network, serving to impart an N-port multi-port function to the M-number of one-port cell blocks, N being an integer of more than one; and
   connections for a conflict management circuit connected to control the global switching network in the case of conflicts between the N ports,
   wherein the outputs of a conflict management circuit, for each of the N ports, a first cache line index for identifying the contents of any one or any plurality of the M-number of one-port cell blocks, a second cache line index for selecting any or any plurality of the M-number of one-port cell blocks, a cache line offset allowing the cache line to comprise more than one data word, and a read/write instruction transmitted from a microcomputer core are supplied to at least the global switching network, and instructions or data words are transmitted to or from the global switching network.

37. The N-port data memory according to claim 36, wherein the number M of said one-port cell blocks is less than the number N of ports of said N-port data memory.

38. The N-port data memory according to claim 36, wherein said N-port data memory and an N-port tag memory are combined to form a combined N-port tag-data memory, and the word length of said combined N-port tag-data memory is represented by "mtag+W*$2^{mword}$" where mtag represents the number of bits of an address allocated to a tag, mword represents the number of bits of an address, allocated to a cache line offset, mword being 0 or more, and W represents the word length of an instruction or a data word.

39. The N-port data memory according to claim 36, wherein said cell blocks included in said N-port data memory are L-port cell blocks having the number L of ports not less than 1 and less than N (1<L<N, L being an integer).

40. The N-port data memory according to claim 36, wherein a tag memory forming a pair with said data memory comprises $L_{tag}$-port cell blocks having the number $L_{tag}$ of ports ($L_{tag}$ being an integer not less than one), and said data memory comprises $L_{data}$-port cell blocks having the number $L_{data}$ of ports ($L_{data}$ being an integer not less than one and differing from $L_{tag}$).

41. An N-port tag memory, comprising:
   an M-number of one-port cell blocks, M being an integer of one or more;
   a port transition circuit for converting the function of the one-port cell block to the function of an N-port block, N being an integer more than one;
   an M-number of N-port blocks, the function of which has been obtained by mounting the port transition circuit to each of the M-number of one-port cell blocks;
   a circuit network performing the address decoding function for N-ports to be connected to the M-number of N-port blocks; and
   connections for a conflict management circuit to control, in case of an access conflict, the circuit network performing the address decoding function for the M-number of N-port blocks;
   wherein, for each of the N ports, a first cache line index for identifying the contents of any one or any plurality of the M-number of one-port cell blocks and a read/write instruction from a microcomputer are supplied to at least the port transition circuit and the outputs of a conflict management circuit, and, again for each of the N ports, a second cache line index for selecting any one or any plurality of the M-number of one-port cell blocks and a read/write instruction from a microcomputer core are supplied to at least the circuit network performing the address decoding function for the M-number of N-port blocks.

42. The N-port tag memory according to claim 41, wherein the number M of said one-port cell blocks is less than the number N of ports of said N-port tag memory.

43. The N-port tag memory according to claim 41, wherein said N-port tag memory and an N-port data memory are combined to form a combined N-port tag-data memory, and the word length of said combined N-port tag-data memory is represented by "mtag+W*$2^{mword}$" where mtag represents the number of bits of an address allocated to a tag, mword represents the number of bits of an address allocated to a cache line offset, mword being 0 or more, and W represents the word length of an instruction or a data word.

44. The N-port tag memory according to claim 41, wherein said N-port blocks included in said N-port tag memory comprise L-port cell blocks having the number L of ports not less than 1 and less than N (1<L<N, L being an integer), and a port transition circuit for converting the function of the L-port cell block to the function of the N-port block.

45. An N-port data memory, comprising:
   an M-number of one-port cell blocks, M being an integer of one or more;
   a port transition circuit for converting the function of the one-port cell block to the function of an N-port block, N being an integer more than one;
   an M-number of N-port blocks the function of which has been obtained by mounting the port transition circuit to each of the M-number of one-port cell blocks;
   a circuit network performing the address decoding function for N-ports to be connected to the M-number of N-port blocks; and
   connections for a conflict management circuit to control, in case of an access conflict, the circuit network performing the address decoding function for the M-number of N-port blocks,
   wherein, for each of the N ports, a first cache line index for identifying the contents of any one or any plurality of the M-number of one-port cell blocks, a cache line offset allowing the cache line to comprise more than one data word, and a read/write instruction from a microcomputer are supplied to at least the port transition circuit and the outputs of a conflict management circuit, and, again for each of the N ports, a second cache line index for selecting any one or any plurality of the M-number of one-port cell blocks and a read/write instruction from a microcomputer core are supplied to at least the circuit network performing the address decoding function for the M-number of N-port blocks, and data words or instructions are transmitted to or from the circuit network performing the address decoding function of the M-number of N-port blocks.

46. The N-port data memory according to claim 45, wherein the number M of said one-port cell blocks is less than the number N of ports of said N-port data memory.

47. The N-port data memory according to claim 45, wherein an N-port tag memory and said N-port data memory are combined to form a combined N-port tag-data memory, and the word length of said combined N-port tag-data memory is represented by "mtag+W*$2^{mword}$" where mtag represents the number of bits of an address allocated to a tag, mword represents the number of bits of an address allocated to a cache line offset, mword being 0 or more, and W represents the word length of an instruction or a data word.

48. The N-port data memory according to claim 45, wherein said N-port blocks included in said N-port data memory comprise L-port cell blocks having the number L of ports not less than 1 and less than N (1<L<N, L being an integer), and a port transition circuit for converting the function of the L-port cell block to the function of the N-port block.

49. An N-port tag memory, comprising:

an $M_B$-number of one-port cell blocks, where $M_B$ is represented by M*$M_S$, each of $M_S$ and M being an integer of one or more;

an $M_S$-number of global switching networks, each including a bus system, a crossbar switch or a multistage interconnection network, each serving to impart N-port multi-port functions to an M-number of one-port cell blocks, N being an integer of more than one; and an $M_S$-number of connections for conflict management circuits connected to control the global switching networks in the case of access conflicts between the N-ports, wherein the outputs of a conflict management circuit, for each of the N ports, a first cache line index for identifying the contents of any one or any plurality of the M-number of one-port cell blocks, a second cache line index for selecting any one or any plurality of the M-number of one-port cell blocks, and a read/write instruction transmitted from a microcomputer core are supplied to at least each of the global switching networks.

50. An N-port data memory, comprising:

an $M_B$-number of one-port cell blocks, where $M_B$ is represented by M*$M_S$, each of $M_S$ and M being an integer of one or more;

an $M_S$-number of global switching networks, each including a bus system, a crossbar switch or a multistage interconnection network, each serving to impart an N-port multi-port function to an M-number of one-port cell blocks, N being an integer of more than one; and an MS-number of connections for conflict management circuits connected to control the global switching networks in the case of conflicts between the N ports, wherein the outputs of a conflict management circuit, for each of the N ports, a first cache line index for identifying the contents of any one or any plurality of the M-number of one-port cell blocks, a second cache line index for selecting any one or any plurality of the M-number of one-port cell blocks, a cache line offset allowing the cache line to comprise more than one data word, and a read/write instruction transmitted from a microcomputer core are supplied to at least each of the global switching networks, and instructions or data words are transmitted to or from each of the global switching networks.

51. An N-port tag memory, comprising:

an $M_B$-number of one-port cell blocks, where $M_B$ is represented by M*$M_S$, each of $M_S$ and M being an integer of one or more;

a port transition circuit for converting the function of at least one of the one-port cell blocks to the function of an N-port block, N being an integer more than one;

an $M_B$-number of N-port blocks, the function of which has been obtained by mounting the port transition circuit to each of the $M_B$-number of one-port cell blocks;

an $M_S$-number of circuit networks performing the address decoding function for N-ports to be connected to an M-number of N-port blocks; and an $M_S$-number of connections for conflict management circuits to control, in case of an access conflict, the respective circuit network performing the address decoding function for the M-number of N-port blocks;

wherein, for each of the N ports, a first cache line index for identifying the contents of any one or any plurality of the M-number of one-port cell blocks, and a read/write instruction from a microcomputer are supplied to the port transition circuit and the outputs of a conflict management circuit, and, again for each of the N ports, a second cache line index for selecting any one or any plurality of the M-number of one-port cell blocks and a read/write instruction from a microcomputer core are supplied to at least each of the circuit networks performing the address decoding function for the M-number of N-port blocks.

52. An N-port data memory, comprising:

an $M_B$-number of one-port cell blocks, where $M_B$ is represented by M*$M_S$, each of $M_S$ and M being an integer of one or more;

a port transition circuit for converting the function of at least one of the one-port cell blocks to the function of an N-port block, N being an integer more than one;

an $M_B$-number of N-port blocks, the function of which has been obtained by mounting the port transition circuit to each of the $M_B$-number of one-port cell blocks;

an $M_S$-number of circuit networks performing the address decoding function for N-ports to be connected to an M-number of N-port blocks; and an $M_S$-number of connections for conflict management circuits to control, in case of an access conflict, the respective circuit network performing the address decoding function for the M-number of N-port blocks, wherein, for each of the N ports, a first cache line index for identifying the contents of any one or any plurality of the M-number of one-port cell blocks, a cache line offset allowing the cache line to comprise more than one data word, and a read/write instruction from a microcomputer are supplied to the transition circuit and the outputs of a conflict management circuit, and, again for each of the N ports, a second cache line index for selecting any one or any plurality of the M-number of one-port cell blocks and a read/write instruction from microcomputer core are supplied to at least each of the circuit networks performing the address decoding function for the M-number of N-port blocks, and data words or instructions are transmitted to or from each of the circuit networks performing the address decoding function of the M-number of N-port blocks.

* * * * *